United States Patent [19]

Zeiszler

[11] Patent Number: 5,416,139
[45] Date of Patent: May 16, 1995

[54] STRUCTURAL BUILDING MATERIALS OR ARTICLES OBTAINED FROM CROP PLANTS OR RESIDUES THEREFROM AND/OR POLYOLEFIN MATERIALS

[76] Inventor: Dennis E. Zeiszler, 3502 22nd St. South, Fargo, N. Dak. 58104-6520

[21] Appl. No.: 132,849

[22] Filed: Oct. 7, 1993

[51] Int. Cl.$^6$ .............................................. C08K 11/00
[52] U.S. Cl. ......................................... 524/13; 524/9; 524/15
[58] Field of Search .................. 524/13, 15, 9; 162/99

[56] References Cited

U.S. PATENT DOCUMENTS

| | | | |
|---|---|---|---|
| 4,340,513 | 7/1982 | Moteki et al. | 524/13 |
| 4,746,688 | 5/1988 | Bistak et al. | 524/15 |
| 4,832,791 | 5/1989 | Detert et al. | 162/99 |
| 4,833,181 | 5/1989 | Narukawa et al. | 524/13 |
| 5,130,352 | 7/1992 | Chow | 524/13 |
| 5,194,461 | 3/1993 | Bergquist et al. | 524/15 |

Primary Examiner—Paul R. Michl
Assistant Examiner—La Vonda R. Dewitt
Attorney, Agent, or Firm—David A. Lingbeck

[57] ABSTRACT

Structural building materials or articles obtained from a composition comprising crop plants or residues therefrom and/or virgin or recycled polyolefin materials or plastics blended and combined with coloring agents which give the particular color desired to the structural articles and with bonding agents such as the natural thick sticky substance commonly found in sugarbeets to provide the necessary cohesiveness to the structural articles and/or with ultraviolet stabilizers and/or impact modifiers, which may be extruded through a profile die or compression molded or injection molded in a conventional mold in heated platens as such to produce the desired structural articles such as door jambs, door sills, garage jambs, deck materials, sheets of varied dimensions, sidings, shingles, door slabs, window sashes and frames, moldings, etc., which effectively replaces wood as the primary component of such structural articles.

5 Claims, No Drawings

STRUCTURAL BUILDING MATERIALS OR ARTICLES OBTAINED FROM CROP PLANTS OR RESIDUES THEREFROM AND/OR POLYOLEFIN MATERIALS

BACKGROUND OF THE INVENTION

This invention relates to structural building materials or articles obtained from crop plants and/or virgin or recycled polyolefin materials which comprises processed crop plants or residues thereof including plant fibers and/or resinous polymers or plastics, bonding agents, and water repellant agents which are either extruded through a profile die into useable building materials or articles such as door jambs, door sills, garage jambs, door slabs, deck materials, sheets approximating 4 by 8 feet, moldings, vinyl sidings, shingles, window sashes and frames, and other types of building materials.

The prior art describes building materials comprising a matrix of cellulosic substrates mixed with polyolefins to form wood-like structures which are typically used in place of wood and which are environmentally and structurally sound. The cellulosic materials described include soybeans, straw pulverized in flour form and other like materials but do not describe the composition of the materials of the present invention.

One known prior art is PREFAB PANELS AND SYSTEM FOR BUILDING CONSTRUCTION, U.S. Pat. No. 4,154,030, comprising a plurality of columns and beams adapted to interconnect to one another, said columns and beams comprising molded waste material and resinous polymer binder.

Another known prior art is a PROCESS FOR PRODUCING COMPOSITE MATERIALS, U.S. Pat. No. 5,151,238, comprising a cellulosic substrate being treated with a solution of a polyfunctional isocyanate in an aprotic swelling solvent to form the composite material.

Another known prior art is A WALL MATERIAL AND METHOD OF PREPARING A WALL MATERIAL OF SOILS AND VEGETABLE MATERIALS, U.S. Pat. No. 4,947,611, comprising pulverized straw, pulverized chaff, and pulverized palm material which are mixed with clay with the mixture being poured into a form and dried.

Another known prior art is a MODULAR BUILDING STRUCTURE, U.S. Pat. No. 4,530,196, comprising corrugated paperboard sheets which can be cut, scored and folded into multiple layers to form a building structure.

Another known prior art is an INSULATED WALL AND WALL PART, U.S. Pat. No. 4,258,275, comprising a sheet of plywood, masonite, plastic, metal lath, or the like and including a wall plate.

Another known prior art is a PEANUT HULL THERMAL INSULATION, U.S. Pat. No. 4,572,815, comprising either a course grade or a medium grade of peanut hulls mixed with dust for blown insulation.

Another known prior art is a COMPOSITION BOARD, U.S. Pat. No. 4,364,979, comprising chicory root particles mixed with bagasse fibres and a filler in the form of coffee grounds to provide strength to the board.

Another known prior art is a LIGHTWEIGHT BUILDING COMPONENT, U.S. Pat. No. 5,177,924, comprising untreated chopped straw, grain chaff, rice husks, rock and/or glass fibers, binders, and mineral additives.

Another known prior art is a BUILDING COMPONENT AND METHOD OF MAKING THE SAME, U.S. Pat. No. 4,301,198, comprising a peripheral sidewall composed of shredded waste material closed upon by a reinforced binder.

Another known prior art is a CONSTRUCTION MATERIAL OBTAINED FROM RECYCLED POLYOLEFINS CONTAINING OTHER POLYMERS, U.S. Pat. No. 5,030,662, for profiled extruded forms such as fence posts, door frames, rails, railway sleepers, and other applications where lumber is conventionally used. The compositions used therein comprise a mixed plastic matrix, reactive compatibilizers, impact modifiers, and reinforcing agents, and foaming agents if desired.

The building materials or articles of the present invention include sugarbeet pulp which has been primarily used only as feed for farm animals predominately in Japan as such and which can be mixed with resinous materials such as polyolefins to form building materials or articles upon extrusion or compression. There is a definite need for building materials or articles of the present invention which use materials such as sugarbeet pulp which is a readily available resource to make building materials or articles which have been primarily made from wood.

SUMMARY OF THE INVENTION

The present invention relates to building materials or articles obtained from crop plants or residues thereof, in particular, sugarbeet pulp, and/or virgin or recycled polyolefin materials or plastics, natural adhesives or bonding agents such as molasses, and coloring agents to give the building materials or articles their particular color. The mixed composition comprises at least 50% by volume or by weight of pulverized or broken down sugarbeet pulp with the balance being made up of polyolefin materials, colorant agents such as dyes of various colors, water repellant agents, and/or ultraviolet resistant compounds and impact modifiers all of which are metered or measured and thoroughly mixed and generally liquefied in a molten composition and either extruded through a profile die or compression or injection molded in a die to obtain the desired structural materials or articles which replace wood products and include building materials such as door sills, shingles, door slabs, and sheets.

One object of the present invention is to provide building materials or articles made from residues of readily available and grown crop plants which are a readily renewable resource unlike wood which takes years for the trees to grow and mature before they can be used for building materials or articles.

Another object of the present invention is to provide building materials or articles which are essentially indestructible and damage free unlike wood products which can be split and damaged upon impact.

Also, another object of the present invention is to provide building materials or articles which are substantially stronger than wood products.

Further, another object of the present invention is to provide building materials or articles which can be easily colored during the process of making the building materials or articles.

Also, another object of the present invention is to provide building materials or articles which is lighter and has a lower density than structural materials made primarily from polyolefin polymer matrixes and is just as strong or stronger than such materials.

Yet, another object of the present invention is to provide building materials or articles which can be readily recycled thus virtually eliminating waste.

DETAILED DESCRIPTION OF THE INVENTION

In accordance with this invention, compositions have been developed from crop plants and/or crop plant residues such as sugarbeet pulp, virgin or recycled polyolefin materials which can be readily extruded or compression molded or injection molded into building materials or articles such as door jambs, door sills, garage jambs, deck materials, sheets approximating 4 feet by 8 feet, shingles, sidings, door slabs, windows sashes and frames, moldings, and other building materials or articles. Generally, the composition of the invention comprises: (a) an essentially crop plant or the residue therefrom such as sugarbeet pulp; (b) an essentially polyolefin material or plastic; (c) a coloring agent or a dye; (d) optionally, a bonding agent or adhesive such as molasses; (e) optionally, an ultraviolet stabilizer; and (f) optionally, an impact modifier.

The crop plant or the residue therefrom such as sugarbeet pulp makes up preferably 50% by weight or by volume of the composition, but may be not less than 50% and not more than 98% by weight or by volume of the composition. The sugarbeet pulp which is the residue obtained during the processing of sugarbeets which is a root generally processed into sugar, is generally pulverized or broken down into a blendable form by conventional upstream equipment and mixed with polyolefin material which preferably is 49% by weight or by volume of the composition, but which may comprise anywhere from 0% to not more than 50% by weight or by volume of the composition. The polyolefin material may include High Density Polyethylene (HDPE), Low Density Polyethylene (LDPE), Linear Low Density Polyethylene (LLDPE), Ultra High Molecular Weight Polyethylene (UHMWPE), polypropylene (homo- and copolymers), or combinations thereof. The polyolefin material may also contain minor amounts of one or more polymeric materials such as Polyvinyl Chloride (PVC) (rigid or flexible), chloro-sulfonated polyethylene, compounded (reinforced) and modified polypropylene. The pulverized sugarbeet pulp and polyolefin material may be blended together and extruded through a conventional extrusion device or compressed molded or injected molded in conventional dies into the desired building materials or articles. During the processing of this composition, the polyolefin material essentially encapsulates the sugarbeet pulp and provides the characteristics of shape, strength, color, and resistance to impacts and ultraviolet radiation. However, building materials or articles can be obtained without the inclusion of the polyolefin material in the composition which can include up to 98% by weight or by volume of sugarbeet pulp with the balance of the composition being a bonding agent such as molasses which can be compressed molded or injection molded through a physicochemical process in heat platens as such to form the desired building materials or articles.

With regards to component (c), the coloring agent is a conventional dye and can be of various colors and may comprise from 1% to 5% by weight or by volume of the composition or may comprise about 1 parts per hundred parts of the composition. The coloring agent is added and mixed with component (a) or with components (a) and (b) in the composition prior to the composition being extruded through a conventional profile die or compression molded or injection molded in a conventional mold in heated platens or a die.

Many different types of bonding agents or adhesives may be used to provide cohesiveness and bonding strength to the building materials or articles. Sugarbeets which is the crop plant from which sugarbeet pulp is obtained contains a thick sticky substance which may be used to bond the sugarbeet pulp and/or the polyolefin material together during the extrusion or compression molding or injection molding process to obtain the building materials or articles desired. The thick sticky substance is commonly combined with water during the processing of sugarbeets to produce molasses which is a brown viscid syrup prepared from raw sugar during sugar manufacturing processing. Other conventional bonding agents or adhesives may be used in addition to the natural thick sticky substance found in sugarbeets and sugarbeet pulp to bond the components together to make the building materials or articles.

To the compositions of this invention, there may be added conventional ultraviolet stabilizers, lubricants, antistatic agents, antifungal agents, and impact modifiers, depending upon the ultimate use of the extruded or compressed or injection molded product. A wide variety of impact modifiers, component (f) may be used. Generally, they include rubbery polymers having a high glass transition temperature. The preferred impact modifiers are ionomer resins rubbers such as EPDM or modified Ethylene-Propylene-Diene-Monomer rubber EPDM, ethylene vinyl acetate copolymers, ethyleneacrylic acid copolymers, ethylene-methacrylic acid copolymers, ethylene-ethyl acrylate, methacrylic acid terpolymer, methyl methacrylate grafted polybutylene, methyl methacrylate-styrene grafted rubbers, styrene butadiene rubber, styrene-butadiene-styrene block copolymers, acrylic rubbers, ethylene-methyl acrylate copolymers, ethylene-ethylacrylate copolymers, and polycarbonates. The amounts of impact modifiers generally fall within the range of about 5 to about 25 parts per hundred parts of the sugarbeet pulp and/or polyolefin composition. Most preferred amounts range from 5 to 15 parts per hundred parts.

The compositions of this invention can be prepared by metering the amount of pulverized or broken down sugarbeet pulp and/or polyolefin material in conventional upstream metering or measuring devices and by mixing the various components in a conventional blender such as a tumble blender, a Henschel-type mixer, or a ribbon blender and by compounding the composition through a twin-screw extruder or a continuous mixer/single-screw extruder combination and then generally pelletizing the extrudate strands in a conventional pelletizer. The pellets produced can be extruded into a specific structural profile by a single-screw extruder with a profile die using the appropriate downstream take-off equipment or by compression molding or injection molding the pellets in a conventional mold using heat and pressure to liquefy the composition in a molten form to effectively and essentially form and shape the desired structural building materials or articles.

The selection of the appropriate operating conditions may be readily determined by those skilled in the art. Generally, processing temperatures may range from 150 Degrees Celsius to 180 Degrees Celsius which are sufficient to generally liquefy the composition in a molten material which can be extruded through a profile die or compressed or injected into a conventional mold to obtain the desired building materials or articles which have excellent surface appearance and physical properties and which can be easily recycled using the present technology.

This invention is a welcomed contribution to ecological preservation, wood preservation, environmental protection, and using a readily available renewable resource, namely sugarbeet pulp to produce useable structural building materials or articles.

The present invention is further illustrated by the following example:

In this example, three compositions were prepared by blending or mixing the components and profile extruding the mixed components in a conventional extruder and by compressing or injection molding the mixed components in a state-of-the-art die apparatus or heated platens to make selected building materials or articles. The compositions and product characteristics are given below in Tables 1, 2, and 3.

TABLE 1

| Components, % by wt. | Extrusion Processing |
| --- | --- |
| Sugarbeet Pulp | 50 |
| Polyolefin Material | 49 |
| Brown Color Conc. | 1 |

TABLE 2

| Components, % by wt. | Injection Molding |
| --- | --- |
| Sugarbeet Pulp | 50 |
| Polyolefin Material | 49 |
| Brown Color Conc. | 1 |

TABLE 3

| Components, % by wt. | Compression Molding |
| --- | --- |
| Sugarbeet Pulp | 90 |
| Bonding Agent - Molasses | 10 |

TABLE 4

| Building Materials Made From | Pounds Per Board Foot |
| --- | --- |
| Sugarbeet Pulp and/or Polyolefin | 2–2.5 |
| Polyolefin Polymer Matrix (Polypropylene) | 4–4.5 |

The foregoing disclosure and example of the invention are intended merely to be illustrative and explanatory thereof. Various changes may obviously be made without departing from the scope of the invention which is defined in the following claims.

What is claimed is:

1. A mixed composition which is extrudable through a profile die into a structural article which comprises: (A) a crop plant of not less than 50% and not more than 98% by weight or by volume, said crop plant being a residue therefrom, said crop plant residue comprising sugarbeet pulp; (B) a coloring agent of approximately 1 part per hundred of said composition; and (C) a polyolefin material in an amount sufficient for the balance of said composition, said polyolefin material including virgin or recycled plastics.

2. A mixed composition which is capable of being compression molded or injection molded in heated platens or dies into a structural article which comprises: (A) a crop plant of not less than 50% and not more than 98% by weight or by volume, said crop plant being a residue therefrom, said crop plant residue comprising sugarbeet pulp; (B) a coloring agent of approximately 1 part per hundred of said composition; and (C) a polyolefin material in an amount sufficient for the balance of said composition, said polyolefin material including virgin or recycled plastics.

3. A mixed composition which is capable of being compression molded in heated platens into a structural article which comprises: (A) a crop plant of from 75% to 98% by weight or by volume, said crop plant being a residue therefrom, said crop plant residue comprising sugarbeet pulp; and (B) a bonding agent in an amount sufficient for the balance of said composition.

4. A mixed composition which is capable of being compression molded in heated platens into a structural article as described in claim 3, wherein said bonding agent is a natural viscid substance processed from sugarbeet for providing cohesiveness to said structural article.

5. A mixed composition which is capable of being compression molded in heated platens into a structural article as described in claim 4, wherein said natural viscid substance comprises molasses.

* * * * *